United States Patent
Zhao et al.

(10) Patent No.: US 10,457,517 B2
(45) Date of Patent: Oct. 29, 2019

(54) DEVICE FOR SEPARATING GUMMED PAPER AND LINING PAPER OF DOUBLE-SIDED TAPE

(71) Applicant: Beijing Xiaomi Mobile Software Co., Ltd., Beijing (CN)

(72) Inventors: Ziran Zhao, Beijing (CN); Tao Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/895,791

(22) Filed: Feb. 13, 2018

(65) Prior Publication Data
US 2018/0244487 A1 Aug. 30, 2018

(30) Foreign Application Priority Data

Feb. 24, 2017 (CN) .......................... 2017 1 0103593

(51) Int. Cl.
*B32B 43/00* (2006.01)
*B65H 35/00* (2006.01)
(Continued)

(52) U.S. Cl.
CPC ....... *B65H 35/0033* (2013.01); *B65H 35/004* (2013.01); *B65H 35/008* (2013.01);
(Continued)

(58) Field of Classification Search
CPC . B32B 38/10; B32B 43/006; Y10T 156/1195; Y10T 156/1994; Y10T 156/195; Y10T 156/1956
(Continued)

(56) References Cited

U.S. PATENT DOCUMENTS 3,902,956 A * 9/1975 Thompson, Jr. ... B65H 35/0033
156/523
4,345,966 A * 8/1982 Iiyama ............... B65H 35/0033
156/523
(Continued)

FOREIGN PATENT DOCUMENTS

CN 2343133 Y 10/1999
CN 2421251 Y 2/2001
(Continued)

OTHER PUBLICATIONS

CN Office Action in connection with Chinese Application No. 201710103593.8, dated Oct. 25, 2017, 7 pages.
(Continued)

*Primary Examiner* — Mark A Osele
*Assistant Examiner* — Nickolas R Harm
(74) *Attorney, Agent, or Firm* — Arch & Lake LLP

(57) ABSTRACT

A device for separating a gummed paper and a lining paper of a double-sided tape is provided. In an example, the device includes a housing, a first rotating structure and a second rotating structure which are provided within the housing and a control part. A chamber for accommodating a double-sided tape coil is provided in the housing. The control part fits the chamber, and the double-sided tape coil is rotatable around the control part. The housing is provided with a sliding groove for accommodating the first rotating structure. When the first rotating structure abuts against the second rotating structure, the first rotating structure is positioned in a first limiting part of the sliding groove.

17 Claims, 3 Drawing Sheets

(51) Int. Cl.
*B65H 41/00* (2006.01)
*B32B 38/10* (2006.01)

(52) U.S. Cl.
CPC .............. *B65H 41/00* (2013.01); *B32B 38/10* (2013.01); *B32B 43/006* (2013.01); *B65H 2301/46176* (2013.01); *B65H 2301/46312* (2013.01); *B65H 2404/144* (2013.01); *Y10T 156/1174* (2015.01); *Y10T 156/1195* (2015.01); *Y10T 156/195* (2015.01); *Y10T 156/1956* (2015.01); *Y10T 156/1994* (2015.01)

(58) Field of Classification Search
USPC .................... 156/715, 719, 759, 760, 767
See application file for complete search history.

(56) References Cited

U.S. PATENT DOCUMENTS

| | | | | |
|---|---|---|---|---|
| 4,582,558 | A * | 4/1986 | Antonson | B60B 7/00 156/523 |
| 5,562,262 | A * | 10/1996 | Pennell | B65H 35/0033 156/577 |
| 6,712,113 | B1 * | 3/2004 | Peggion | B65H 35/0033 156/574 |
| 7,175,062 | B2 * | 2/2007 | Shah | B65H 35/0026 225/47 |
| 8,215,527 | B2 * | 7/2012 | Fathi | B65H 35/0026 156/577 |
| 2004/0099380 | A1 * | 5/2004 | Ho | B65H 35/0033 156/577 |
| 2005/0056378 | A1 | 3/2005 | Schwertfeger | |
| 2007/0194165 | A1 * | 8/2007 | Lee | B65H 35/0026 242/411 |
| 2007/0246153 | A1 * | 10/2007 | Schurman | B29C 63/10 156/185 |
| 2008/0135181 | A1 * | 6/2008 | Lee | B65H 35/0033 156/530 |
| 2011/0047733 | A1 * | 3/2011 | Jiang | A47L 13/144 15/119.2 |
| 2012/0018087 | A1 * | 1/2012 | Hu | B65H 35/0033 156/270 |

FOREIGN PATENT DOCUMENTS

| | | |
|---|---|---|
| CN | 2589432 Y | 12/2003 |
| CN | 203854909 U | 10/2014 |
| CN | 204938528 U | 1/2016 |
| CN | 206494564 U | 9/2017 |
| DE | 2801540 A1 | 7/1979 |
| FR | 2657074 A1 | 7/1991 |

OTHER PUBLICATIONS

European Extended Search Report issued in corresponding EP Patent Application No. 18156776.9 dated Jul. 25, 2018, 7 pages.

* cited by examiner

DEVICE FOR SEPARATING GUMMED PAPER AND LINING PAPER OF DOUBLE-SIDED TAPE

CROSS REFERENCE TO RELATED APPLICATION

This application claims priority to Chinese Patent Application No. 201710103593.8, filed on Feb. 24, 2017, the entire content of which is incorporated herein by reference.

TECHNICAL FIELD

The present disclosure relates to a device for separating a gummed paper and a lining paper of a double-sided tape.

BACKGROUND

A double-sided tape is a common bonding tool and includes a gummed paper and a lining paper. The lining paper may be bonded to one surface of the gummed paper. When used, the double-sided tape may be cut off with a scissor or torn off by hand, and then the gummed paper and the lining paper of the double-sided tape may be separated with fingernail or another sharp tool.

SUMMARY

In view of this, a device for separating a gummed paper and a lining paper of a double-sided tape is provided by an example of the present disclosure, so that the gummed paper and the lining paper can be automatically separated, thereby facilitating operation.

In a first aspect, the device for separating a gummed paper and a lining paper of a double-sided tape may include a housing, a first rotating structure and a second rotating structure which are provided within the housing and a control part. A chamber for accommodating a double-sided tape coil is provided in the housing. The control part is fitted with the chamber, and the double-sided tape coil is rotatable around the control part. The housing is further provided with a sliding groove for accommodating the first rotating structure. When the first rotating structure abuts against the second rotating structure, the first rotating structure is positioned in a first limiting part of the sliding groove.

The device for separating the gummed paper and the lining paper of the double-sided tape includes the first rotating structure, the second rotating structure and the control part for mounting the double-sided tape coil. The first rotating structure and the second rotating structure are provided within the housing. The double-sided tape coil can be rotated around the control part. While, the lining paper of the double-sided tape pre-placed between the first rotating structure and the second rotating structure can be removed through the rotation of the first rotating structure and the second rotating structure and their mutual abutting relationship in position. Thus, the gummed paper and the lining paper of the double-sided tape can be automatically separated when being used, thereby facilitating operation.

In a second aspect, a tape dispenser includes a housing comprising a chamber for accommodating a tape coil. The tape dispenser also includes a first rotating structure and a second rotating structure. Both the first rotating structure and the second rotating structure are disposed at least partially within the housing. The tape dispenser includes a control part disposed in the chamber, where the tape coil is rotatable around the control part. The tape dispenser includes a sliding groove provided on the housing for accommodating the first rotating structure. When the first rotating structure abuts against the second rotating structure, the first rotating structure is positioned in a first limiting part of the sliding groove.

It should be understood that the above general descriptions and the following detailed descriptions are merely illustrative and explanatory and are not intended to limit the present disclosure.

BRIEF DESCRIPTION OF DRAWINGS

The accompanying drawings, which are incorporated in and constitute a part of the present description, illustrate examples consistent with the present disclosure and serve to explain the principles of the present disclosure together with the description.

DETAILED DESCRIPTION

Exemplary examples will be described in detail herein, examples of which are shown in the accompanying drawings. When the following description refers to the accompanying drawings, the same numerals in different drawings denote the same or similar elements unless otherwise indicated. The embodiments described in the following exemplary examples are not representative of all embodiments coincident with the present disclosure. In contrast, they are merely examples of devices and methods coincident with some aspects of the present disclosure as detailed in the appended claims.

Figure 1:
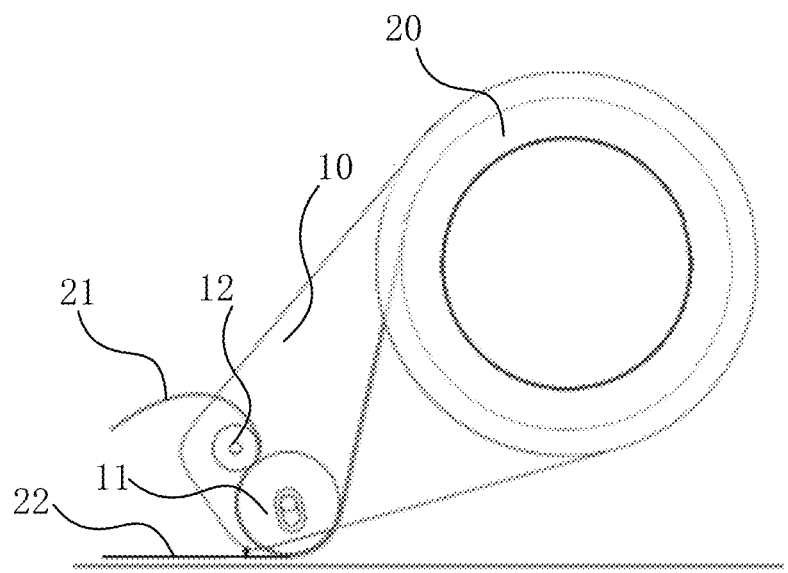
FIG. 1 is a schematic diagram illustrating a device for separating a gummed paper and a lining paper of a double-sided tape in an operating condition according to an example of the present disclosure.
Figure 3:
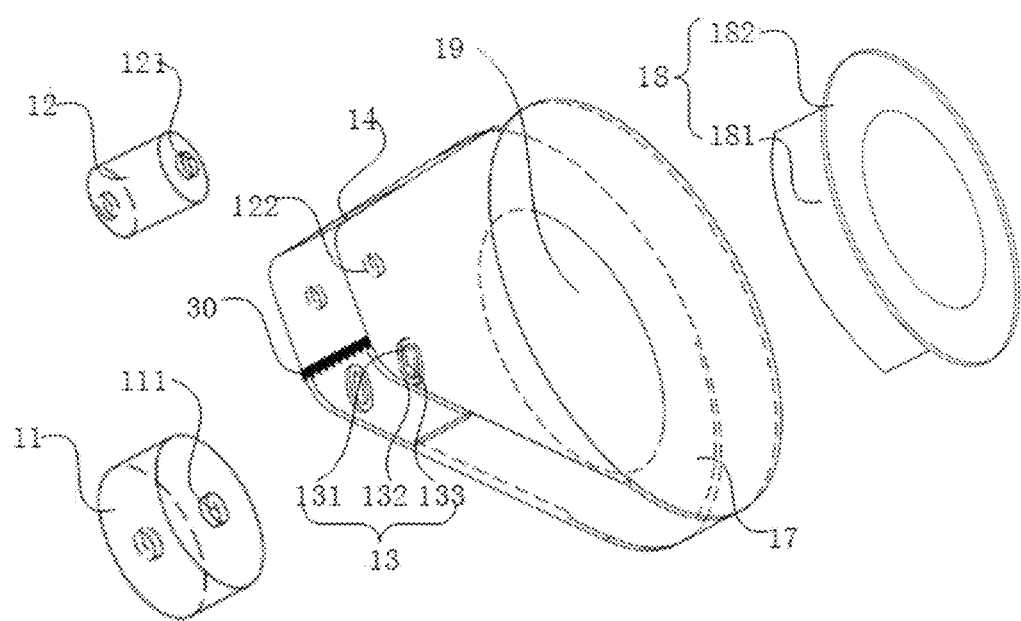
FIG. 3 is a stereoscopic exploded view of a device for separating a gummed paper and a lining paper of a double-sided tape according to an example of the present disclosure.

FIG. 1 is a schematic diagram illustrating a device for separating a gummed paper and a lining paper of a double-sided tape in an operating condition according to an example of the present disclosure. FIG. 3 is a stereoscopic exploded view of the device for separating the gummed paper and the lining paper of the double-sided tape according to an example of the present disclosure. As shown in FIG. 1 and FIG. 3, the device may include a housing 10, a first rotating structure 11 and a second rotating structure 12 which are provided within the housing 10, and a control part 18. A chamber 17 for accommodating a double-sided tape coil 20 is provided in the housing 10. The control part 18 is disposed in the chamber 17 and the double-sided tape coil 20 may rotate around the control part 18. Further, the housing 10 is provided with a sliding groove 13 for accommodating the first rotating structure 11. When the first rotating structure 11 abuts against the second rotating structure 12, the first rotating structure 11 may be positioned in a first limiting part 131 of the sliding groove 13. The first rotating structure 11 may include a first rotating wheel has a first wheel diameter. The second rotating structure 12 may include a second rotating wheel has a second wheel diameter shorter than the first wheel diameter.

When the housing 10 is pressed down, the first rotating structure 11 may slide to the first limiting part 131 along the sliding groove 13 and then abut against the second rotating structure 12. The lining paper 21 pre-placed between the first rotating structure 11 and the second rotating structure 12 can be removed through the rotation of the two rotating structures and their mutual abutting relationship in position. Therefore, according to the present disclosure, the gummed paper 22 and the lining paper 21 of the double-sided tape can be automatically separated, thereby facilitating operation.

Figure 2:
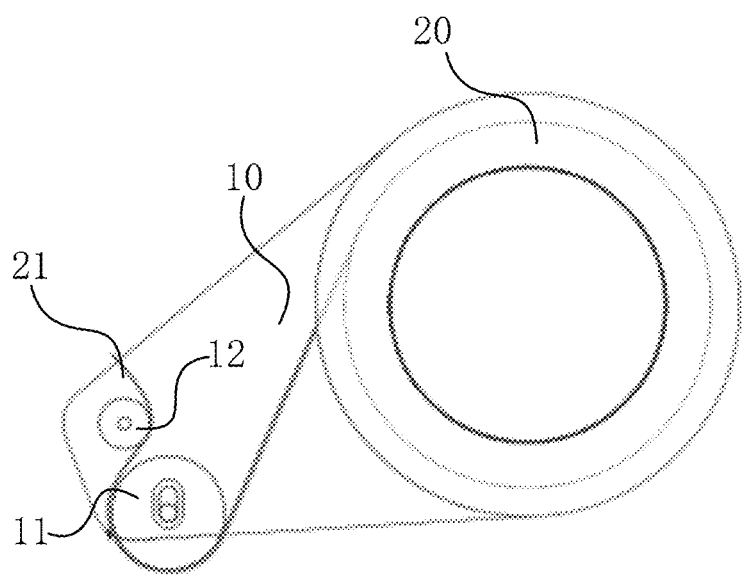
FIG. 2 is a schematic diagram illustrating a device for separating a gummed paper and a lining paper of a double-sided tape without being operated according to an example of the present disclosure.

FIG. 2 is a schematic diagram illustrating the device for separating the gummed paper and the lining paper of the double-sided tape without being used according to an example of the present disclosure. As shown in FIG. 1, FIG. 2 and FIG. 3, the housing 10 is provided with the sliding groove 13 for accommodating the first rotating structure 11. A shape of the sliding groove 13 may be a runway. The sliding groove 13 includes the first limiting part 131, a second limiting part 132, and a channel between the first and second limiting parts 131 and 132. For example, the channel may be a slideway 133 for connecting the two limiting parts 131 and 132. A first rotating axis 111 of the first rotating structure 11 is accommodated in the sliding groove 13. The first rotating axis 111 can rotate in the sliding groove 13 and further slide along the slideway 133.

When the first rotating structure 11 is located in a position other than the first limiting part 131 in the sliding groove 13, the first rotating structure 11 does not abut against the second rotating structure 12. At this case, there is a gap between the first rotating structure 11 and the second rotating structure 12, and then the lining paper 21 may be inserted in the gap.

When the first rotating structure is contacted with a position to be bonded, the housing 10 may be pressed down, and at this time, the first rotating axis 111 may slide to the first limiting part 131 along the sliding groove 13, such as along the slideway 133, so that the first rotating structure 11 can abut against the second rotating structure 12.

The housing 10 is provided with a receiving groove 122. A second rotating axis 121 of the second rotating structure 12 may be accommodated in the receiving groove 122, and the second rotating axis 121 may rotate within the receiving groove 122. When the first rotating structure 11 abuts against the second rotating structure 12, the rotation of the first rotating structure 11 may drive the second rotating structure 12 to rotate, so as to remove the lining paper 21 inserted therebetween.

The first rotating structure 11 and the second rotating structure 12 may be located at a first end of the housing 10. The control part 18 may be located at a second end of the housing 10 which is opposite to the first end to facilitate pulling out the double-sided tape. The second rotating structure 12 may be arranged above the first rotating structure 11. Therefore, when the housing 10 is pressed down in such a way that the first rotating structure 11 is pressed against a position to be bonded and slides upward to the first limiting part 131, the first rotating structure 11 can abut against the second rotating structure 12. The housing 10 may be provided with a first opening 16 located below the first rotating structure 11. A distance between the first limiting part 131 and the first opening 16 is smaller than a diameter of the first rotating structure 11 so that the gummed paper 22 can extend out of the first opening 16 to perform bonding operation. In addition, a cutting part 30 may be provided at a front end of the first opening 16. When it is not required to use the double-sided tape, the tape can be directly cut off with the cutting part 30, without additional cutting or tearing operation, thereby facilitating use.

When pressing is stopped and the first rotating structure 11 leaves the position to be bonded, the first rotating structure 11 may slide to the second limiting part 132 along the slideway 133 due to its own gravity. The second limiting part 132 may prevent the first rotating structure 11 from sliding out of the sliding groove 13 when the first rotating structure 11 does not abut against the second limiting part 132.

It is noted that the sliding groove 13 can be a runway in shape or have another limiting parting structure as long as it can implement the above limiting parting function.

The control part 18 may be a control wheel that includes a pressing part 182 and a mounting part 181 extending from the pressing part 182. The mounting part 181 is fitted with the chamber 17. As shown in FIG. 3, the chamber 17 has an upper opening facing the control part 18 and a lower opening opposite to the upper opening. For example, the pressing part 182 has a diameter slightly shorter than the inner diameter of the upper opening of the chamber 17 so that the mounting part 182 fits tightly inside the upper opening of the chamber 17. Further, the mounting part 181 has a diameter slightly shorter than the inner diameter of the lower opening of the chamber 17 so that the mounting part 181 fits tightly inside the lower opening of the chamber 17. Two opposite sides of the double-sided tape coil 20 in an axial direction can abut against the housing 10 and the pressing part 182, respectively. As the double-sided tape coil rotates around the control part 18 when being used, a stop operation can be implemented by pressing the pressing part 182 and the housing 10 to squeeze the double-sided tape coil 20, and thus the stop operation is relatively easy to activate. An assembly part 19 is provided in the housing 10. The chamber 17 is defined by the assembly part 19 and the housing 10, and the mounting part 181 is snapped in the assembly part 19, thereby facilitating mounting.

Figure 4:
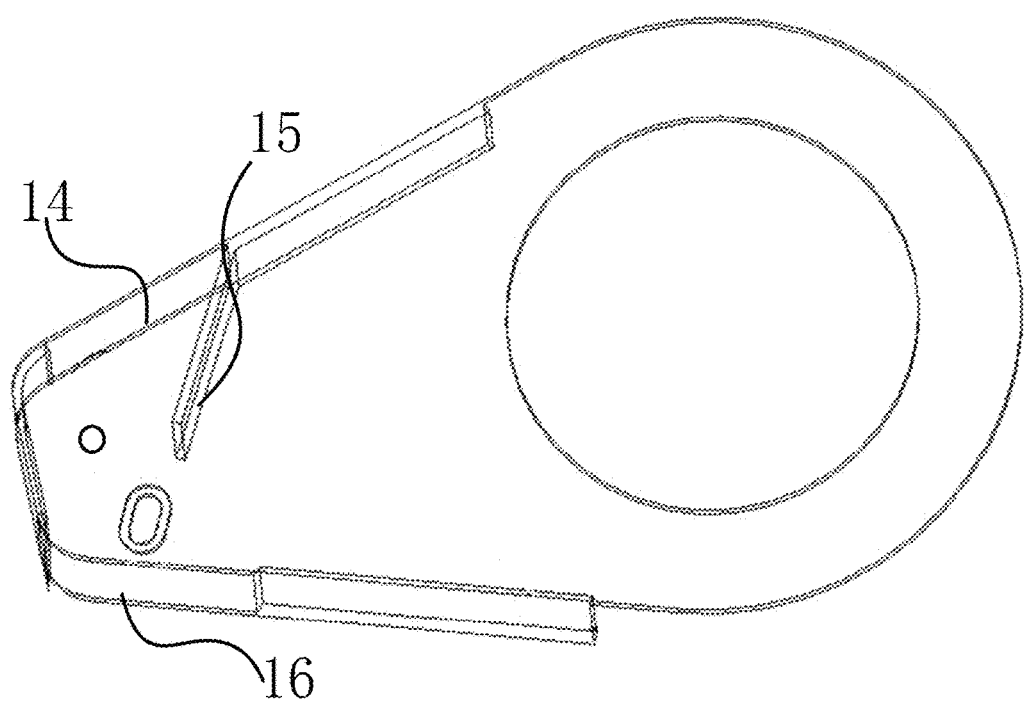
FIG. 4 is a stereoscopic view of a device for separating a gummed paper and a lining paper of a double-sided tape according to an example of the present disclosure.

FIG. 4 is a stereoscopic diagram illustrating the housing of the device for separating the gummed paper and the lining paper of the double-sided tape according to an example of the present disclosure. As shown in FIG. 4, the housing 10 is provided with a second opening 14 through which the lining paper 21 can extend out. The housing 10 is further provided with a lining paper guide plate 15. One end of the lining paper guide plate 15 is adjacent to a position at which the first rotating structure 11 abuts the second rotating structure 12, and the other end of the lining paper guide plate 15 is arranged on the housing 10 between the second opening 14 and the chamber 17 to guide the lining paper 21 out of the housing 10. The position of the second opening 14 and the position of the lining paper guide plate 15 are not limited as long as they can facilitate guiding the lining paper 21 out of the housing 10.

The double-sided tape coil 20 may be accommodated within the housing 10 and rotate around the control part 18. Therefore, the double-sided tape can be pulled out by rotating the double-sided tape coil 20. The lining paper 21 may first abut against the first rotating structure 11, and then the housing 10 is pressed down, such that the gummed paper 22 is in contact with a position to be bonded. It is noted that when you start using the double-sided tape 20, the gummed paper 22 with a particular length should be removed. For example, the length of the removed gummed paper 22 may be greater than or equal to a length of the lining paper 21 from the first opening 16 to the second opening 14 through the first rotating structure 11 and the second rotating structure 12. The lining paper 21 may be inserted in the gap between the first rotating structure 11 and the second rotating structure 12. The gummed paper 22 may be bonded to a specified position through a pressing relationship between the first rotating structure 11 and the specified position. In addition, after the gummed paper 22 is bonded with the specified position, the gummed paper 22 and the lining paper 21 can be further pulled out by pulling back the housing 10.

Figure 5:
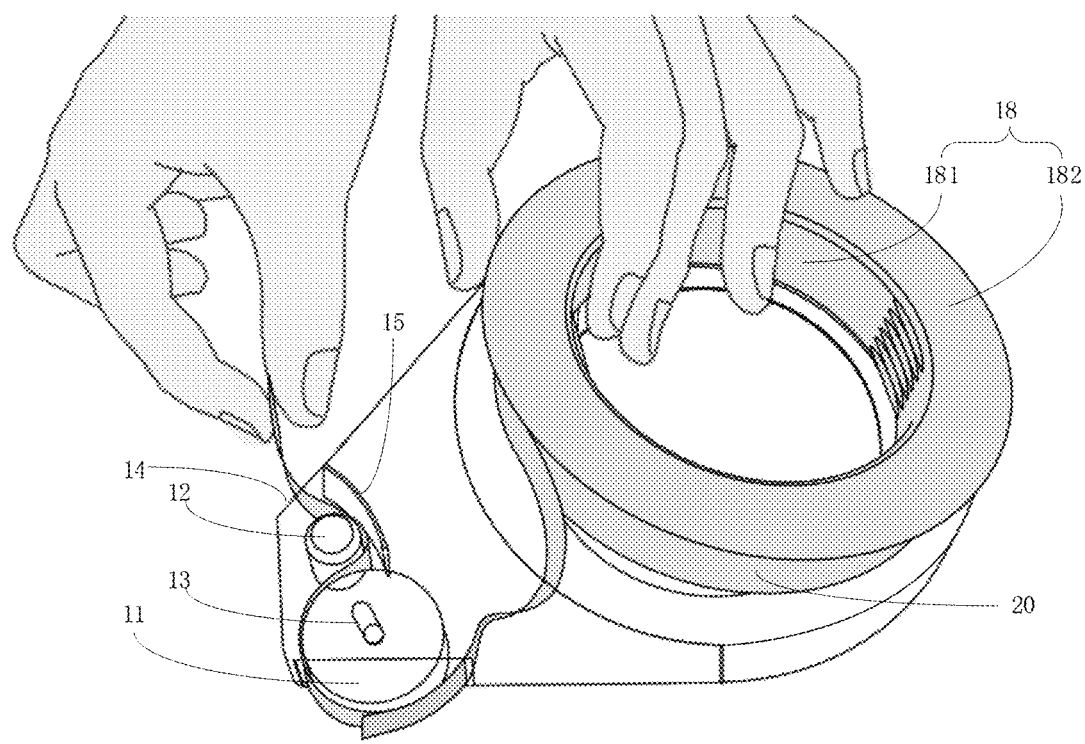
FIG. 5 is a schematic diagram illustrating a device for separating a gummed paper and a lining paper of a double-sided tape in an operating condition according to another example of the present disclosure.

FIG. 5 is a diagram illustrating the device for separating the gummed paper and the lining paper of the double-sided tape in the operating condition according to another example of the present disclosure. As shown in FIG. 5, some ridges may be provided on the inside of the control part 18. In this case, when a user presses the control part 18, friction force between the hand of the user and the control part 18 can be increased, thereby preventing the control part 18 rotating with the double-sided tape 20. In summary, the device provided in the present disclosure facilitates separating the gummed paper and the lining paper of the double-sided tape, so that the double-sided tape can be used more conveniently.

After considering the description and practicing the present disclosure, those skilled in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The description and examples herein are intended to be illustrative only and the real scope and spirit of the present disclosure are indicated by the following claims.

It should be understood that the present disclosure is not limited to the precise structures described above and shown in the accompanying drawings and may be modified or changed without departing from the scope of the present disclosure. The scope of protection of the present disclosure is limited only by the appended claims.

What is claimed is:

1. A device for separating a gummed paper and a lining paper of a double-sided tape, comprising:
    a housing comprising a chamber, wherein a double-sided tape coil is accommodated in the chamber;
    a first rotating structure and a second rotating structure, both the first rotating structure and the second rotating structure are disposed at least partially within the housing;
    a control part disposed in the chamber, wherein the double-sided tape coil is rotatable around the control part; and
    a sliding groove provided on the housing, wherein the sliding groove comprises a first limiting part and a second limiting part,
    wherein, when the first rotating structure abuts against the second rotating structure, the first rotating structure is positioned in the first limiting part of the sliding groove; and when the first rotating structure does not abut against the second rotating structure, the first rotating structure is positioned in the second limiting part of the sliding groove;
    wherein the housing is provided with a first opening located below the first rotating structure;
    wherein a distance between the first limiting part and the first opening is smaller than a diameter of the first rotating structure, so that the gummed paper is capable of extending out of the first opening to perform bonding operation before being separated from the lining paper; and
    wherein the device further comprises a cutting part at a front end of the first opening.

2. The device of claim 1, wherein,
    a rotating axis of the first rotating structure is accommodated in the sliding groove and is moveable along the sliding groove.

3. The device of claim 1, wherein, during a process of using the device,
    the first rotating structure abuts against the second rotating structure;
    the lining paper is between the first rotating structure and the second rotating structure; and
    rotation of the first rotating structure drives the second rotating structure to rotate, so as to remove the lining paper.

4. The device of claim 1, wherein the control part comprises:
    a pressing part; and
    a mounting part extending from the pressing part and fitting with the chamber.

5. The device of claim 4, wherein,
    an assembly part is arranged within the housing; and
    the mounting part is snapped in the assembly part.

6. The device of claim 1, wherein,
    the first rotating structure and the second rotating structure are located at a first end of the housing and the control part is located at a second end of the housing which is opposite to the first end; and
    the second rotating structure is arranged above the first rotating structure.

7. The device of claim 6, wherein,
    the housing is provided with a receiving groove, and
    a rotating axis of the second rotating structure is accommodated in the receiving groove.

8. The device of claim 1, wherein the housing is provided with a second opening through which the lining paper of the double-sided tape extends out.

9. The device of claim 8, wherein,
    a lining paper guide plate is provided within the housing;
    the first rotating structure abuts against the second rotating structure at a position; and
    one end of the lining paper guide plate is adjacent to the position at which the first rotating structure abuts against the second rotating structure, and the other end of the lining paper guide plate is arranged on the housing between the second opening and the chamber.

10. A tape dispenser, comprising:
    a housing comprising a chamber, wherein a double-sided tape coil is accommodated in the chamber, the double-side tape coil comprising a gummed paper and a lining paper;
    a first rotating structure and a second rotating structure, both the first rotating structure and the second rotating structure are disposed at least partially within the housing;
    a control part disposed in the chamber, wherein the tape coil is rotatable around the control part; and
    a sliding groove provided on the housing, wherein the sliding groove comprises a first limiting part and a second limiting part;
    wherein, when the first rotating structure abuts against the second rotating structure, the first rotating structure is positioned in the first limiting part of the sliding groove; and when the first rotating structure does not abut against the second rotating structure, the first rotating structure is positioned in the second limiting part of the sliding groove;

wherein the housing is provided with a first opening located below the first rotating structure;

wherein a distance between the first limiting part and the first opening is smaller than a diameter of the first rotating structure, so that the gummed paper is capable of extending out of the first opening to perform bonding operation before being separated from the lining paper; and wherein the device further comprises a cutting part at a front end of the first opening.

11. The tape dispenser of claim 10, wherein, a rotating axis of the first rotating structure is accommodated in the sliding groove and is moveable along the sliding groove.

12. The tape dispenser of claim 10, wherein, during a process of using the tape dispenser,
the first rotating structure abuts against the second rotating structure;
the lining paper is between the first rotating structure and the second rotating structure; and
rotation of the first rotating structure drives the second rotating structure to rotate, so as to remove the lining paper.

13. The tape dispenser of claim 10, wherein the control part comprises:
a pressing part; and
a mounting part extending from the pressing part and fitting with the chamber.

14. The tape dispenser of claim 13, wherein,
an assembly part is arranged within the housing; and
the mounting part is snapped in the assembly part.

15. The tape dispenser of claim 10, wherein,
the first rotating structure and the second rotating structure are located at a first end of the housing and the control part is located at a second end of the housing which is opposite to the first end; and
the second rotating structure is arranged above the first rotating structure.

16. The tape dispenser of claim 15, wherein,
the housing is provided with a receiving groove; and
a rotating axis of the second rotating structure is accommodated in the receiving groove.

17. The tape dispenser of claim 16, wherein the tape coil includes a double-sided tape having a lining paper;
wherein the housing is provided with a second opening through which the lining paper of the double-sided tape extends out;
wherein a lining paper guide plate is provided within the housing; and
the first rotating structure abuts against the second rotating structure at a position; and one end of the lining paper guide plate is adjacent to the position at which the first rotating structure abuts against the second rotating structure, and the other end of the lining paper guide plate is arranged on the housing between the second opening and the chamber.

* * * * *